United States Patent
Shi et al.

(10) Patent No.: US 10,425,318 B2
(45) Date of Patent: Sep. 24, 2019

(54) METHOD FOR HEARTBEAT PACKET PROCESSING BY USING PROXY, APPARATUS, AND COMMUNICATIONS SYSTEM

(71) Applicant: Huawei Technologies Co., Ltd., Shenzhen (CN)

(72) Inventors: Jieke Shi, Shanghai (CN); Lin Yu, Shanghai (CN); Chien-Nan Lin, Taipei (TW)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 15/476,033

(22) Filed: Mar. 31, 2017

(65) Prior Publication Data
US 2017/0289007 A1 Oct. 5, 2017

(30) Foreign Application Priority Data
Apr. 1, 2016 (CN) .......................... 2016 1 0203335

(51) Int. Cl.
*H04L 12/26* (2006.01)
*H04W 4/00* (2018.01)
(Continued)

(52) U.S. Cl.
CPC .......... *H04L 43/106* (2013.01); *H04J 3/0661* (2013.01); *H04L 43/00* (2013.01); *H04L 67/2804* (2013.01); *H04L 67/288* (2013.01); *H04L 67/2842* (2013.01); *H04W 4/80* (2018.02); *H04W 56/001* (2013.01); *Y02D 30/40* (2018.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/166* (2018.01); *Y02D 70/26* (2018.01)

(58) Field of Classification Search
CPC ............ H04W 56/00; H04L 29/08; H04J 3/06
See application file for complete search history.

(56) References Cited

U.S. PATENT DOCUMENTS 6,587,693 B1   7/2003 Lumme et al.
7,917,613 B2 *  3/2011 Letca ...................... H04L 43/10
                                                  709/223
(Continued)

FOREIGN PATENT DOCUMENTS

CN   104348522 A   2/2015
CN   104837168 A   8/2015
(Continued)

*Primary Examiner* — Rasheed Gidado
(74) *Attorney, Agent, or Firm* — Leydig, Voit & Mayer, Ltd.

(57) ABSTRACT

The embodiments of the present invention provide a method for heartbeat packet processing by using a proxy, an apparatus, and a communications system. The method includes: receiving, by a host, a first heartbeat packet sent by a first application in a client, where the client is a terminal that accesses the host by using a short range communications technology; and determining, by the host according to the first heartbeat packet and a first preset list, whether the first application is included in the first preset list. Thus, an objective of saving power for the host and the client can be achieved.

14 Claims, 5 Drawing Sheets

(51) Int. Cl.
*H04W 56/00* (2009.01)
*H04J 3/06* (2006.01)
*H04L 29/08* (2006.01)
*H04W 4/80* (2018.01)

(56) References Cited

U.S. PATENT DOCUMENTS

| | | | | |
|---|---|---|---|---|
| 8,583,101 | B1 * | 11/2013 | Xu | H04W 52/0216 455/422.1 |
| 8,849,961 | B2 * | 9/2014 | Hartikainen | H04L 67/14 370/229 |
| 9,036,616 | B2 * | 5/2015 | Sundararajan | H04W 56/0025 370/350 |
| 2004/0013118 | A1 * | 1/2004 | Borella | H04L 12/4633 370/395.2 |
| 2005/0188098 | A1 * | 8/2005 | Dunk | H04L 67/14 709/232 |
| 2008/0168470 | A1 * | 7/2008 | Bushell | G06F 9/52 719/313 |
| 2009/0328027 | A1 * | 12/2009 | Tsuchiya | G06F 8/65 717/171 |
| 2013/0275563 | A1 * | 10/2013 | Luna | H04L 67/2842 709/219 |
| 2014/0003352 | A1 * | 1/2014 | Dai | H04L 41/0836 370/328 |
| 2016/0057654 | A1 | 2/2016 | Backholm et al. | |
| 2017/0235492 | A1 * | 8/2017 | Liu | G06F 3/061 711/165 |
| 2017/0366620 | A1 | 12/2017 | Zhang | |

FOREIGN PATENT DOCUMENTS

| | | |
|---|---|---|
| CN | 105429883 A | 3/2016 |
| DE | 19820162 A1 | 11/1999 |
| WO | 9912364 A3 | 5/1999 |
| WO | 9957920 A2 | 11/1999 |
| WO | 2012060995 A2 | 5/2012 |

* cited by examiner

200

| A host receives a first heartbeat packet sent by a first application in a client, where the client is a device that accesses the host by using a short range communications technology | ~ S210 |

| The host adjusts first heartbeat time information to perform time synchronization with second heartbeat time information of a second application in the host within a limited adjustment time or for not more than a limited quantity of adjustment times, and sends a second heartbeat packet to a server on a network side by using the time-synchronized second application as a proxy for the first application | ~ S220 |

FIG. 3

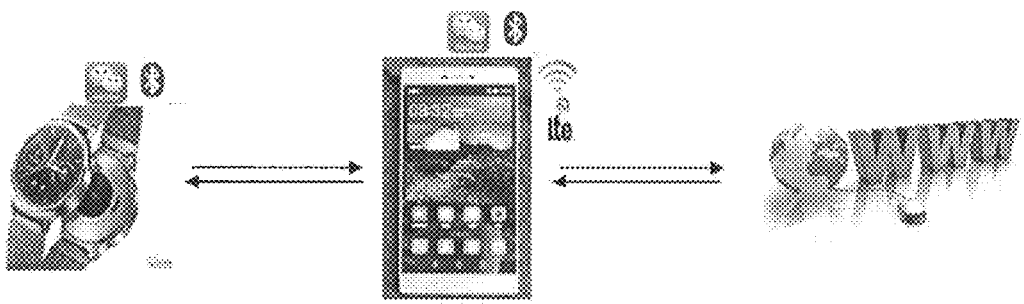

FIG. 4

METHOD FOR HEARTBEAT PACKET PROCESSING BY USING PROXY, APPARATUS, AND COMMUNICATIONS SYSTEM

CROSS-REFERENCE TO RELATED APPLICATION

This application claims priority to Chinese Patent Application No. 201610203335.2, filed on Apr. 1, 2016, which is hereby incorporated by reference in its entirety.

TECHNICAL FIELD

The embodiments of the present invention relate to the communications field, and in particular, to a method for heartbeat packet processing by using a proxy, an apparatus, and a communications system in the communications field.

BACKGROUND

Currently, a growing quantity of electronic apparatuses do not have a capability of directly connecting to a network, but can connect to other apparatuses by using connectivity apparatuses of the electronic apparatuses, and then connect to the network. The connectivity apparatuses may be WiFi, Bluetooth (BT), and the like.

A client apparatus may be a wearable device, or an electronic apparatus such as a mobile phone, a tablet computer, or a notebook computer. Many wearable devices do not have a capability of directly connecting to a network. Therefore, the wearable devices may connect to a paired electronic apparatus by using Bluetooth, and then exchange messages by using Bluetooth. The electronic apparatus may be referred to as a host apparatus.

Currently, a heartbeat packet technology is widely applied between a client and a server, to discover network exceptions, and may apply to multiple occasions. A principle of the heartbeat packet technology is: a client periodically sends a heartbeat detection packet to a server on the Internet at a fixed time interval; the client determines whether a heartbeat response packet returned by the server is received within preset duration; if the heartbeat response packet returned by the server is not received within the preset duration, the client considers that a network connection to the server has deteriorated (for example, timeout, interruption, or congestion), the server is not suitable for providing network services any longer, and then the client attempts to restore the connection by using a method for re-connecting to or re-selecting the server.

When the wearable devices need to perform heartbeat packet processing, the wearable devices may first notify a mobile phone by using Bluetooth. The mobile phone connects to a network to perform heartbeat packet processing. After obtaining a response, the mobile phone notifies the wearable devices by using Bluetooth.

For electronic apparatuses such as a mobile phone, a tablet computer, and a notebook computer, when an electronic apparatus has a network access capability and a hotspot is enabled, the electronic apparatus is equivalent to a host apparatus, and other electronic apparatuses may connect to the host apparatus by using WiFi, and then connect to a network by using the host apparatus.

Therefore, when one heartbeat packet event is generated in each apparatus, the heartbeat packet event must be initiated by a client apparatus, and then a host apparatus processes each heartbeat packet. Power consumption of the client and the host is relatively large.

SUMMARY

Embodiments of the present invention provide a method for heartbeat packet processing by using a proxy, so as to reduce respective quantities of wakeup times of different apparatuses, and reduce power consumption of the apparatuses.

According to a first aspect, an embodiment of the present invention provides a method for heartbeat packet processing by using a proxy, including:

receiving, by a host, a first heartbeat packet sent by a first application in a client, where the client is a terminal that accesses the host by using a short range communications technology;

determining, by the host according to the first heartbeat packet and a first preset list, whether the first application is included in the first preset list, where the first preset list includes at least one application that is preset and for which the host performs heartbeat packet processing by using a proxy;

if the first application is included in the first preset list, determining, by the host, first heartbeat time information of the first application according to the first heartbeat packet; and performing, by the host, time synchronization between the first heartbeat time information and second heartbeat time information of a second application in the host, and sending a second heartbeat packet to a server on a network side by using the time-synchronized second application as a proxy for the first application.

Therefore, an embodiment of the present invention provides a method for heartbeat packet processing by using a proxy. A host performs time synchronization between first heartbeat time information and second heartbeat time information of a second application in the host, and sends a second heartbeat packet to a server on a network side by using the time-synchronized second application as a proxy for a first application, so that, a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Optionally, the determining, by the host, first heartbeat time information of the first application according to the first heartbeat packet includes:

determining, by the host according to the first heartbeat packet and a second preset list, the first heartbeat time information, where the second preset list includes a correspondence between at least one heartbeat packet and at least one piece of heartbeat time information, or the first heartbeat packet carries the first heartbeat time information; and parsing, by the host, the first heartbeat packet to obtain the first heartbeat time information.

Therefore, an embodiment of the present invention provides a method for heartbeat packet processing by using a proxy. According to a first heartbeat packet and a second preset list or according to first heartbeat time information carried in a first heartbeat packet, a host can determine the first heartbeat time information of a first application, and then can perform time synchronization between the first heartbeat time information and second heartbeat time information of a second application in the host.

Optionally, the first heartbeat time information includes a first heartbeat trigger time and a first time interval, and the second heartbeat time information includes a second heartbeat trigger time and a second time interval.

Therefore, an embodiment of the present invention provides a method for heartbeat packet processing by using a proxy. A host may perform time synchronization between first heartbeat time information and second heartbeat time information of a second application in the host according to a first heartbeat trigger time and a first time interval or a second heartbeat trigger time and a second time interval, and sends a second heartbeat packet to a server on a network side by using the time-synchronized second application as a proxy for a first application, so that, a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Optionally, the host further includes a third preset list, the third preset list includes at least one application for which the host does not perform heartbeat packet processing by using a proxy, and the method further includes:

if neither the first preset list nor the third preset list includes the first application, performing, by the host, time synchronization between the first heartbeat time information and the second heartbeat time information of the second application in the host within a preset adjustment time or for not more than a preset quantity of adjustment times, and sending the second heartbeat packet to the server on the network side by using the time-synchronized second application as a proxy for the first application, to maintain a persistent connection between the first application and the server.

Therefore, an embodiment of the present invention provides a method for heartbeat packet processing by using a proxy. A host performs time synchronization between first heartbeat time information and second heartbeat time information of a second application in the host within a preset adjustment time or for not more than a preset quantity of adjustment times, so that, a client does not need to initiate a heartbeat packet event of a first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Optionally, if the third preset list includes the first application, the host does not send the second heartbeat packet to the server on the network side by using a proxy for the first application.

Therefore, an embodiment of the present invention provides a method for heartbeat packet processing by using a proxy. A third preset list includes at least one application for which a host does not perform heartbeat packet processing by using a proxy, and according to the third preset list, the host may not adjust an application that is in the client and in the third preset list, so that power consumption of the host can be reduced.

Optionally, the determining, by the host according to the first heartbeat packet and a first preset list, whether the first application is included in the first preset list includes:

determining a name of the first application according to the first heartbeat packet; and comparing the name of the first application with a name in the first preset list, to determine whether the first application is in the first preset list, where the first preset list specifically includes a respective name of the at least one application for which the host performs heartbeat packet processing by using a proxy.

Therefore, an embodiment of the present invention provides a method for heartbeat packet processing by using a proxy. A host determines a name of a first application according to a first heartbeat packet, performs time synchronization between first heartbeat time information and second heartbeat time information of a second application in the host, and sends a second heartbeat packet to a server on a network side by using the time-synchronized second application as a proxy for a first application, so that, a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Optionally, after the sending a second heartbeat packet to a server on a network side by using a proxy for the first application, the method further includes:

sending, by the host, to the client, indication information for instructing the host to perform heartbeat packet processing by using a proxy for the first application.

Optionally, the first application and the second application are of a same type.

Optionally, the first preset list, the second preset list, or the third preset list can be updated in real time.

Therefore, an embodiment of the present invention provides a method for heartbeat packet processing by using a proxy. A first preset list, a second preset list, or a third preset list can be updated in real time. A host may process a heartbeat packet of an application in a client by using a proxy according to the first preset list, the second preset list, or the third preset list, so that the client does not need to initiate a heartbeat packet event of the application in the client, so as to reduce a quantity of wakeup times of the client, and the host does not need to be awakened separately by the application in the client and an application in the host, so as to reduce a quantity of wakeup times of the host; therefore, power consumption of the host and the client can be reduced, achieving an objective of saving power for the host and the client.

According to a second aspect, an embodiment of the present invention provides a method for heartbeat packet processing by using a proxy, including:

receiving, by a host, a first heartbeat packet sent by a first application in a client, where the client is a terminal that accesses the host by using a short range communications technology; and adjusting, by the host, a first heartbeat time information of the first heartbeat packet to perform time synchronization with second heartbeat time information of a second application in the host within a preset adjustment time or for not more than a preset quantity of adjustment times, and sending a second heartbeat packet to a server on a network side by using the time-synchronized second application as a proxy for the first application.

Therefore, an embodiment of the present invention provides a method for heartbeat packet processing by using a proxy. A host adjusts first heartbeat time information to perform time synchronization with second heartbeat time information of a second application in the host within a preset adjustment time or for not more than a preset quantity of adjustment times, and sends a second heartbeat packet to a server on a network side by using the time-synchronized second application as a proxy for a first application, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Optionally, the first heartbeat time information includes a first heartbeat trigger time and a first time interval, and the second heartbeat time information includes a second heartbeat trigger time and a second time interval.

Optionally, the receiving, by the host, a first heartbeat packet sent by a first application in a client includes:

receiving, by the host, an encapsulated packet that is sent by the client; and obtaining, by the host, the first heartbeat packet that is of the first application and that is in the encapsulated packet by detecting the encapsulated packet.

Therefore, an embodiment of the present invention provides a method for heartbeat packet processing by using a proxy. A host obtains a heartbeat packet that is of an application and that is in an encapsulated packet by means of detection, performs time synchronization between first heartbeat time information and second heartbeat time information of a second application in the host, and sends a second heartbeat packet to a server on a network side by using the time-synchronized second application as a proxy for a first application, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Optionally, after the sending a second heartbeat packet to a server on a network side by using a proxy for the first application, the method further includes:

sending, by the host, to the client, indication information for instructing the host to perform heartbeat packet processing by using a proxy for the first application.

Optionally, the first application and the second application are of a same type.

Therefore, an embodiment of the present invention provides a method for heartbeat packet processing by using a proxy. A host adjusts first heartbeat time information to perform time synchronization with second heartbeat time information of a second application in the host within a preset adjustment time or for not more than a preset quantity of adjustment times, and sends a second heartbeat packet to a server on a network side by using the time-synchronized second application as a proxy for a first application, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

According to a third aspect, an embodiment of the present invention provides a method for heartbeat packet processing by using a proxy, where the method is applied to a client, the client accesses a host by using a short range communications technology, and the method includes:

sending, by the client, a first heartbeat packet of a first application in the client to the host;

obtaining, by the client, indication information sent by the host to instruct the host to perform heartbeat packet processing by using a proxy for the first application; and stopping, by the client according to the indication information, sending a second heartbeat packet of the first application to the host.

Therefore, an embodiment of the present invention provides a method for heartbeat packet processing by using a proxy. After a client obtains indication information sent by a host to instruct the host to perform heartbeat packet processing by using a proxy for a first application, the client does not need to initiate a heartbeat packet event of the first application in the client, so as to reduce a quantity of wakeup times of the client, and the host does not need to be awakened separately by the first application in the client and a second application in the host, so as to reduce a quantity of wakeup times of the host; therefore, power consumption of the host and the client can be reduced, achieving an objective of saving power for the host and the client.

Optionally, the client sends a first preset list to the host, where the first preset list includes at least one application that is preset and for which the host performs heartbeat packet processing by using a proxy.

Therefore, an embodiment of the present invention provides a method for heartbeat packet processing by using a proxy. A client sends a first preset list to a host, and the host may determine, according to the first preset list, whether to perform processing by using a proxy for the first application, so as to increase a speed at which the host performs processing by using a proxy.

According to a fourth aspect, an embodiment of the present invention provides an apparatus, including:

a receiver, configured to receive a first heartbeat packet sent by a first application in a client, where the client is a terminal that accesses the apparatus by using a short range communications technology;

a controller, configured to:

determine, according to the first heartbeat packet received by the receiver and a first preset list, whether the first application is included in the first preset list, where the first preset list includes at least one application that is preset and for which the apparatus performs heartbeat packet processing by using a proxy;

if the first application is included in the first preset list, determine first heartbeat time information of the first application according to the first heartbeat packet; and perform time synchronization between the first heartbeat time information and second heartbeat time information of a second application in the apparatus, and send a second heartbeat packet to a server on a network side by using the time-synchronized second application as a proxy for the first application; and a transmitter, configured to send the second heartbeat packet of the first application to the server on the network side.

The apparatus is configured to execute the method for heartbeat packet processing by using a proxy in the first aspect or any possible implementation manner of the first aspect. For example, the apparatus may be a host.

Therefore, an embodiment of the present invention provides an apparatus. A host performs time synchronization between first heartbeat time information and second heartbeat time information of a second application in the host, and sends a second heartbeat packet to a server on a network side by using the time-synchronized second application as a proxy for a first application, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

According to a fifth aspect, an embodiment of the present invention provides an apparatus, including:

a receiver, configured to receive a first heartbeat packet sent by a first application in a client, where the client is a terminal that accesses the apparatus by using a short range communications technology;

a controller, configured to adjust the first heartbeat time information to perform time synchronization with second heartbeat time information of a second application in the apparatus within a preset adjustment time or for not more than a preset quantity of adjustment times, and send a second heartbeat packet to a server on a network side by using the time-synchronized second application as a proxy for the first application; and a transmitter, configured to send the second heartbeat packet of the first application to the server on the network side.

The apparatus is configured to execute the method for heartbeat packet processing by using a proxy in the second aspect or any possible implementation manner of the second aspect. For example, the apparatus may be a host.

Therefore, an embodiment of the present invention provides an apparatus. A host adjusts first heartbeat time information to perform time synchronization with second heartbeat time information of a second application in the host within a preset adjustment time or for not more than a preset quantity of adjustment times, and sends a second heartbeat packet to a server on a network side by using the time-synchronized second application as a proxy for a first application, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

According to a sixth aspect, an embodiment of the present invention provides an apparatus, the apparatus accesses a host by using a short range communications technology, and the apparatus includes:

a receiver, configured to send a first heartbeat packet of a first application in the apparatus to the host; and obtain indication information sent by the host to instruct the host to perform heartbeat packet processing by using a proxy for the first application; and a controller, configured to stop, according to the indication information, sending a second heartbeat packet of the first application to the host.

The apparatus is configured to execute the method for heartbeat packet processing by using a proxy in the third aspect or any possible implementation manner of the third aspect. For example, the apparatus may be a client.

Therefore, an embodiment of the present invention provides an apparatus. After a client obtains indication information sent by a host to instruct the host to perform heartbeat packet processing by using a proxy for a first application, the client does not need to initiate a heartbeat packet event of the first application in the client, so as to reduce a quantity of wakeup times of the client, and the host does not need to be awakened separately by the first application in the client and a second application in the host, so as to reduce a quantity of wakeup times of the host; therefore, power consumption of the host and the client can be reduced, achieving an objective of saving power for the host and the client.

According to a seventh aspect, an embodiment of the present invention provides a communications system, including the apparatus according to any possible implementation manner in the fourth aspect or the fifth aspect, or the apparatus according to any possible implementation manner in the sixth aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is another schematic flowchart of a method for heartbeat packet processing by using a proxy according to an embodiment of the present invention;

FIG. 4 is another schematic diagram of an application scenario according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
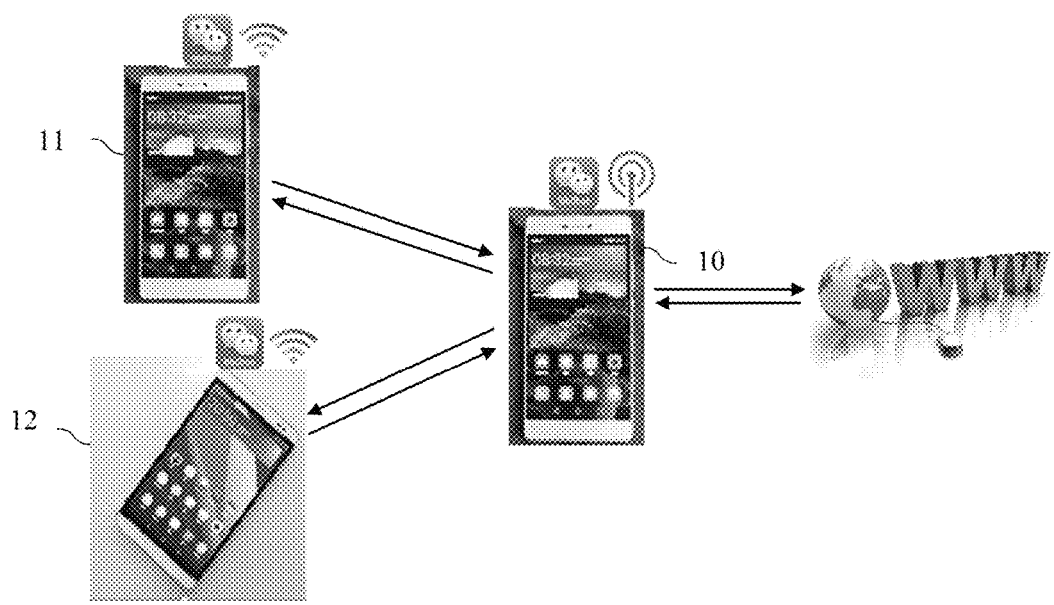
FIG. 1 is a schematic diagram of an application scenario according to an embodiment of the present invention.

FIG. 1 shows a schematic diagram of an application scenario according to an embodiment of the present invention. A host may connect to and pair with one or more clients, and process a heartbeat packet of an application in one or more clients. For example, in FIG. 1, a host 10 may be a mobile phone for which a hotspot is enabled and that connects to a network, and clients may be two mobile phones, that is, a client 11 and a client 12, where the client 11 and the client 12 may connect to and pair with the host 10 by using WiFi, and the host 10 may process a heartbeat packet of WeChat in the client 11 and the client 12.

Specifically, currently, when an electronic apparatus such as a mobile phone or a tablet computer needs to perform heartbeat packet processing, the electronic apparatus first uses WiFi to notify a mobile phone for which a hotspot is enabled, and then connects to the network by using the mobile phone for which the hotspot is enabled, to perform heartbeat packet processing; and after obtaining a response, the mobile phone for which the hotspot is enabled returns a message by using WiFi. Alternatively, when a wearable device needs to perform heartbeat packet processing, the wearable device first notifies a mobile phone by using Bluetooth, and the mobile phone connects to the network to perform heartbeat packet processing; and after obtaining a response, the mobile phone notifies the wearable device by using Bluetooth.

It should be understood that, an apparatus such as a mobile phone, a tablet computer, or a wearable device that needs to connect to another apparatus to perform heartbeat packet processing may be referred to as a client, and an apparatus that performs heartbeat packet processing on a client may be referred to as a host.

Therefore, when one heartbeat packet event is generated in each apparatus, the heartbeat packet event must be initiated by a client, and then a host processes each heartbeat packet. It can be seen that, power consumption of the client and the host is relatively large, and therefore a power saving technology seems to be particularly important.

It should be understood that, currently, merging processing is performed on heartbeat packets of different applications in a same mobile phone or in a same electronic apparatus, and a difference mainly lies in different merging methods. There are mainly two methods. One method is that, a wakeup alarm bell or a timer is registered by using an application, and then a trigger time of the application is adjusted by using the alarm bell or the timer, so as to achieve wakeup alignment for multiple applications. The other method is that, before an encapsulated packet or a socket is transmitted to a network, the encapsulated packet or the socket to be processed is stored in a network management network architecture; and after a condition is met, encapsulated packets of data are transmitted to the network together, so that wakeup alignment for multiple applications is achieved. For example, a unified heartbeat, alarm grouping, and a network socket request manager are all similar such methods. However, in all these methods, wakeup alignment or encapsulated packet alignment in a same electronic apparatus is processed, so as to save power by reducing a quantity of wakeup times. Heartbeat packet processing by using a proxy achieves an objective of saving power mainly by reducing a quantity of some elements to be awakened between different processors of a same mobile phone or a same electronic apparatus.

Therefore, in all current technologies, power consumption of an electronic apparatus is reduced, but power saving between different electronic apparatuses is not processed.

It should be understood that, a similar or same application is installed in most electronic apparatuses. For example, WeChat is installed in a mobile phone, WeChat is also installed in a wearable device, and WeChat may also be installed in a tablet computer, a notebook computer and the like. When these apparatuses use a same network, some apparatuses that do not have an actual capability of connecting to the network register a heartbeat packet management function with an apparatus that has the actual capability of connecting to the network. In this way, heartbeat packets of a same type of applications can be managed at a same time point together; in addition, power consumption for communication between two apparatuses can be saved, and the apparatuses that are managed together are notified only when a status changes, for example, if there is a new message or heartbeat disconnection occurs.

Therefore, an embodiment of the present invention provides a method for heartbeat packet processing by using a proxy. A host performs time synchronization between first heartbeat time information and second heartbeat time information of a second application in the host, and sends a second heartbeat packet to a server on a network side by using the time-synchronized second application as a proxy for a first application, so that a client does not need to initiate a heartbeat packet event of the application in the client, so as to reduce a quantity of wakeup times of the client, and the host does not need to be awakened separately by the application in the client and the application in the host, so as to reduce a quantity of wakeup times of the host; therefore, power consumption of the host and the client can be reduced, achieving an objective of saving power for the host and the client.

Figure 2:
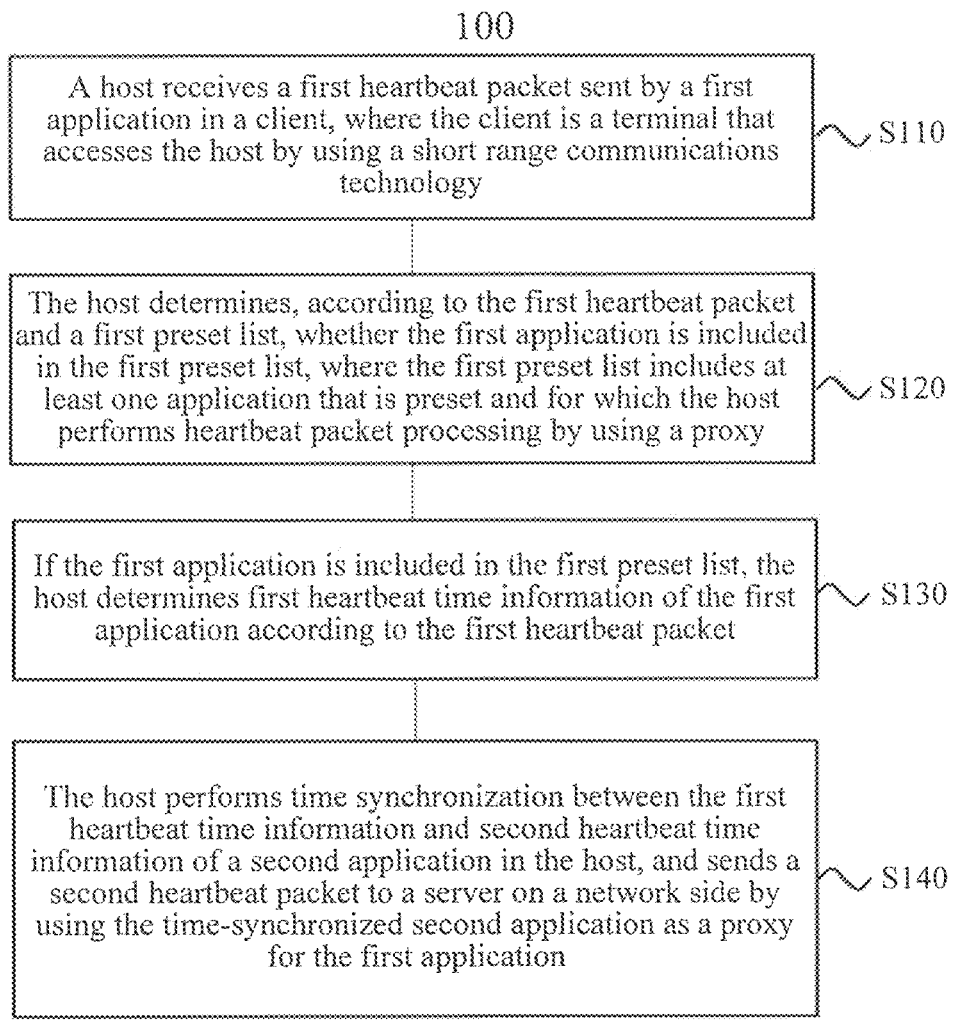
FIG. 2 is a schematic flowchart of a method for heartbeat packet processing by using a proxy according to an embodiment of the present invention.

FIG. 2 is a schematic flowchart of a method for heartbeat packet processing by using a proxy according to an embodiment of the present invention. The method 100 may be executed by a host, and the method 100 includes the following steps.

S110: The host receives a first heartbeat packet sent by a first application in a client, where the client is a terminal that accesses the host by using a short range communications technology.

In S110, the client may be a terminal that accesses the host by using the short range communications technology. Specifically S110 may be that, the host initiates a connection to the client by using the short range communications technology, the client accesses the host by using the short range communications technology, or the client initiates a connection to the host by using the short range communications technology, to access the host. This is not limited in the present invention. In addition, an application (APP) involved in an embodiment of the present invention refers to software that is authored by a developer to achieve an application objective and may be run in an operating system. In addition, to maintain long-time communication with a server on a network side, this type of software supports a heartbeat packet technology, to maintain a persistent connection to the server. For example, the first application may be instant messaging software such as WeChat, LINE, or Tencent QQ.

Specifically, after the host connects to the client, the first application in the client may log in by using a network of the host, and is registered with a server corresponding to the first application. After the first application logs in, a heartbeat connection is generated, and the first heartbeat packet of the first application is generated in the client. The client may send the first heartbeat packet of the first application to the host, and the host may receive the first heartbeat packet of the first application in the client.

It should be understood that, the client sends an encapsulated packet to the host, and the host may directly determine, according to identification information of an application in a first preset list such as an ID, the first heartbeat packet in the encapsulated packet sent by the client, and does not need to determine, by detecting the encapsulated packet, the first heartbeat packet in the encapsulated packet sent by the client. It should be understood that, the host may include a memory or a buffer for storing preset information. The first preset list may be stored in the memory or the buffer, and when information in the first preset list needs to be used, the host may read the information included in the first preset list from the memory or the buffer.

It should be understood that, the client may be any one of apparatuses such as a wearable device, a mobile phone, a tablet computer, and a notebook computer, and the host may also be any one of apparatuses such as a wearable device, a mobile phone, a tablet computer, and a notebook computer. This is not limited in the present invention. It should be noted that, the host is an electronic apparatus that can access the Internet by using a mobile communications technology, for example, can access a core network by using a mobile communications technology such as Long Term Evolution (LTE), Universal Mobile Telecommunications System (UMTS), or 5G, and then connect to the Internet by using the core network. Further, the client accesses the host by using the short range communications technology, and connects to the Internet by using the host, so that the client can communicate with the server on the network side by using the Internet, where the short range communications technology may include a technology such as WiFi, Bluetooth, near field communication (NFC), or infrared. It should be known that, in this embodiment of the present invention, the client needs to support the short range communications function, but is not limited to an electronic device that supports only the short range communications function.

It should be further understood that, one or more clients may access the host by using the short range communications technology. When there are multiple clients, after the multiple clients successfully connect to the host, the host may manage heartbeat packets of a same application in the multiple clients or heartbeat packets of different applications in the multiple clients together at a same time point.

S120: The host determines, according to the first heartbeat packet and a first preset list, whether the first application is included in the first preset list, where the first preset list includes at least one application that is preset and for which the host performs heartbeat packet processing by using a proxy.

Specifically, the first preset list may include identification information of at least one application that is preset and for which the host performs heartbeat packet processing by using a proxy. For example, the identification information is a name, an identifier, or a characteristic value. The host may determine, according to the first heartbeat packet, identification information such as a name, an identifier, or a characteristic value of the first application corresponding to the first heartbeat packet, then compare the identification information of the first application with identification information of an application in a first preset list, and determine whether the first application is included in the first preset list.

Optionally, the host determines a name of the first application according to the first heartbeat packet.

The name of the first application is compared with a name in the first preset list, to determine whether the first application is in the first preset list, where the first preset list specifically includes a respective name of the at least one application for which the host performs heartbeat packet processing by using a proxy.

It should be understood that, the first preset list may be pre-stored in the host or sent by the client.

It should be understood that, the first preset list may include at least one application that is preset and for which the host performs heartbeat packet processing by using a proxy, and additionally the first preset list may further include heartbeat time information of the application, for example, information such as a trigger time and a time interval.

Optionally, after the host connects to the client, the host may receive application registration of the client, where the application registration may be that an application that is in the client and for which the host can perform heartbeat packet processing by using a proxy is registered with the host.

S130: If the first application is included in the first preset list, the host determines first heartbeat time information of the first application according to the first heartbeat packet.

In S130, when the first preset list includes the first application, the host may determine the first heartbeat time information of the first application according to the first heartbeat packet. Specifically, the host may determine the first heartbeat time information according to the first heartbeat packet and a second preset list, where the second preset list includes a correspondence between at least one heartbeat packet and at least one piece of heartbeat time information, or the first heartbeat packet carries the first heartbeat time information, and the host parses the first heartbeat packet to obtain the first heartbeat time information, where the second preset list may also be stored in a memory or a buffer of the host. Details are not described again. In addition, the host may further determine the first heartbeat time information of the first application according to other information, for example, a network access condition. This is not limited in the present invention.

It should be understood that, the first heartbeat time information may include a first heartbeat trigger time and a first time interval, and the second heartbeat time information may include a second heartbeat trigger time and a second time interval.

S140: The host performs time synchronization between the first heartbeat time information and second heartbeat time information of a second application in the host, and sends a second heartbeat packet to a server on a network side by using the time-synchronized second application as a proxy for the first application.

Specifically, the host may understand that heartbeat time information of an application in the host includes a trigger time and a time interval. Therefore, the host may perform time synchronization between the first heartbeat time information and the second heartbeat time information of the second application in the host by adjusting the second heartbeat time information of the second application in the host or adjusting the first heartbeat time information of the first application in the client, where the second application may be an application, in the host, whose trigger time and time interval are closest to the first heartbeat trigger time and the first time interval of the first application.

For convenience of description, an instant chatting tool using a heartbeat packet technology, for example, WeChat, is used as an example herein to describe the solution in this embodiment of the present invention. When a trigger time is 10:30 and a second time interval is five seconds for a heartbeat packet of WeChat in the host, and a trigger time is 10:32 and a first time interval is five seconds for a heartbeat packet of WeChat in the client, the host may adjust the trigger time for WeChat in the client to 10:30, and may also adjust the trigger time for WeChat in the host to 10:32. When the trigger time and the time interval for the heartbeat packet of WeChat in the host are the same as the trigger time and the time interval for the heartbeat packet of WeChat in the client, the host may initiate a heartbeat packet event in place of the client, and the client does not need to initiate a heartbeat packet event, so as to reduce a quantity of wakeup times of the client. In addition, originally the host needs to be awakened twice by WeChat in the host and WeChat in the client; but, now the trigger time and the time interval for the heartbeat packet of WeChat in the host are the same as the trigger time and the time interval for the heartbeat packet of WeChat in the client, and therefore the host needs to initiate a heartbeat packet event only once, that is, be awakened once, and then separately process the heartbeat packet of WeChat in the host and the heartbeat packet of WeChat in the client, so as to reduce a quantity of wakeup times of the host, so that an objective of saving power for the host and the client can be achieved.

It can be seen that, a host performs time synchronization between first heartbeat time information and second heartbeat time information of a second application in the host, and sends a second heartbeat packet to a server on a network side by using the time-synchronized second application as a proxy for a first application, to maintain a persistent connection between the first application and the server, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Specifically, when the host includes the first preset list and the first preset list includes the first application, the host can adjust the first heartbeat time information of the first application according to the determined first heartbeat time information of the first application, and perform time synchronization between the first heartbeat time information and the second heartbeat time information of the second application in the host.

Alternatively, the host adjusts the second heartbeat time information of the second application according to the determined first heartbeat time information of the first application, and performs time synchronization between the second heartbeat time information and the first heartbeat time information.

It should be understood that, the second application is an application in the host, the second application and the first application may be of a same type, or may be of different types. When the first application and the second application are of a same type, that the types are the same may refer to that names of the applications are the same or functions of applications are the same, for example, WeChat and QQ of a same carrier. The host may adjust the trigger time and the first time interval for the heartbeat packet of the first application in the client or adjust the trigger time and the second time interval for the second heartbeat packet of the second application in the host according to the determined first heartbeat time information of the first application, and perform time synchronization between the first heartbeat time information and the second heartbeat time information of the second application in the host.

When the first application and the second application are of different types, the host may adjust the first heartbeat trigger time and the first time interval of the first application in the client or adjust the second heartbeat trigger time and the second time interval of the second application in the host according to the determined first heartbeat time information of the first application, and perform time synchronization between the first heartbeat time information and the second heartbeat time information of the second application in the host, where the second application may be an application that is in the host and whose heartbeat time and heartbeat time interval are closest to those of the first application.

Optionally, when the first preset list does not include the first application, the host attempts to adjust the first heartbeat time information of the first application, including the heartbeat trigger time and the first time interval, that is, adjust the first heartbeat time information of the first application within a preset adjustment time or for not more than a preset quantity of adjustment times, and performs time synchronization between the first heartbeat time information and the second heartbeat time information of the second application in the host.

It should be understood that, the first preset list may be further updated in time; if the host succeeds in the attempt on adjustment, the first application may be added to the first preset list; if the host does not succeed in the attempt on adjustment, the first application may be added to a third preset list.

It should be understood that, the third preset list includes at least one application for which a host does not perform heartbeat packet processing by using a proxy. It should be noted that, the third preset list may also be stored in a memory or a buffer of the host. Details are not described again.

It should be further understood that, after the host adjusts the first heartbeat trigger time and the first time interval of the first application, and performs time synchronization between the first heartbeat time information and the second heartbeat time information of the second application in the host, the host further performs heartbeat packet processing by using a proxy for the first application. This may specifically include that according to the adjusted first heartbeat trigger time and first time interval of the first application, the host initiates a heartbeat packet event of the first application in place of the client, performs heartbeat packet processing, keeps the first application online, and notifies the client when the first application is offline or has a new message.

Alternatively, after the host adjusts the second heartbeat trigger time and the second time interval of the second application, and performs time synchronization between the second heartbeat time information and the first heartbeat time information, the host performs heartbeat packet processing by using a proxy for the first application. This may specifically include that according to the adjusted second heartbeat trigger time and second time interval of the second application, the host initiates a heartbeat packet event of the first application, performs heartbeat packet processing, keeps the first application online, and notifies the client when the first application is offline or has a new message.

Optionally, when the host includes the third preset list, if the third preset list includes the first application, the host does not send the second heartbeat packet to the server on the network side by using a proxy for the first application.

It should be understood that, the third preset list may be pre-stored in the host, and the third preset list may include at least one application for which a host does not perform heartbeat packet processing by using a proxy. When the host includes the third preset list, and the third preset list includes the first application, the host may not adjust the second heartbeat trigger time or the second time interval of the second application in the host.

Optionally, if the host includes the first preset list and the third preset list, and neither the first preset list nor the second preset list includes the first application, the host adjusts the first heartbeat trigger time and the first time interval of the first application within a preset adjustment time or for not more than a preset quantity of adjustment times, and performs time synchronization between the first heartbeat time information and the second heartbeat time information of the second application in the host.

It should be understood that, if the host succeeds in the attempt on adjustment, the first application may be added to the first preset list.

It should be understood that, the first preset list of the host may be a whitelist, and the third preset list may be a blacklist, where an application in the whitelist may indicate an application for which the host can perform heartbeat management, and an application in the blacklist may indicate an application for which the host cannot perform heartbeat management. The whitelist and the blacklist may be pre-stored in the host or added by a user to the host at any time according to experience of the user.

Optionally, after the sending a second heartbeat packet to a server on a network side by using a proxy for the first application, the method further includes:

sending, by the host, indication information to the client, where the indication information instructs the host to send a second heartbeat packet to a server on a network side by using a proxy for the first application in the client.

It should be understood that, when the host disconnects from the client, the host may re-establish the heartbeat packet processing by using a proxy for the first application in the client.

After S140, that is, after the time synchronization is performed between the first heartbeat time information and the second heartbeat time information of the second application in the host, for the client, the client does not need to initiate an heartbeat packet event of the first application, and the host initiates a heartbeat packet event of the first application in place of the client, so as to reduce the quantity of wakeup times of the client; for the host, in the prior art, after the client initiates a heartbeat packet event of the first application, the client needs to awaken the host, and the host performs heartbeat packet processing, and additionally the second application in the host also needs to awaken the host at a moment, and the host initiates a heartbeat packet event of the second application, and processes the heartbeat packet. This is equivalent to that the host needs to be awakened twice. In this embodiment of the present invention, when the host performs time synchronization between first heartbeat time information and second heartbeat time information of a second application in the host, and sends a second heartbeat packet to a server on a network side by using the time-synchronized second application as a proxy for a first application, the host may be awakened only once for the first application and the second application, and initiate a heartbeat packet event once, so as to reduce the quantity of wakeup times of the host, finally achieving the objective of saving power for both the host and the client.

FIG. 2 shows the method for heartbeat packet processing by using a proxy if there is the first preset list in an embodiment of the present invention. FIG. 3 in the following shows a method for heartbeat packet processing by using a proxy when there is no first preset list in an embodiment of the present invention.

Specifically, FIG. 3 is another schematic flowchart of a method for heartbeat packet processing by using a proxy according to an embodiment of the present invention. The method 200 may be executed by a host, and the method 200 includes the following steps.

S210: The host receives a first heartbeat packet sent by a first application in a client, where the client is a device that accesses the host by using a short range communications technology.

S220: The host adjusts first heartbeat time information to perform time synchronization with second heartbeat time information of a second application in the host within a limited adjustment time or for not more than a limited quantity of adjustment times, and sends a second heartbeat packet to a server on a network side by using the time-synchronized second application as a proxy for the first application.

It should be understood that, when the host does not include a first preset list, a second preset list, or a third preset list, the host attempts to adjust the first heartbeat time information of the first application, such as a first heartbeat trigger time and a first time interval, that is, adjust the first heartbeat trigger time and the first time interval of the first application within a pre-determined adjustment time or for not more than a pre-determined quantity of adjustment times, and performs time synchronization between the first heartbeat time information and the second heartbeat time information of the second application in the host, where the second application may be an application whose trigger time and time interval are closest to the first heartbeat trigger time and the first time interval of the first application.

It should be further understood that, the second application in the host sends the second heartbeat packet to the server on the network side as a proxy for the first application, to maintain a persistent connection between the first application and the server. Specifically, the host keeps the first application in the client online, and when the first application in the client has a new message or a status of the first application changes, the host may send a notification to the client by using WiFi or Bluetooth, to notify the first application in the client.

Optionally, the first heartbeat time information includes a first heartbeat trigger time and a first time interval, and the second heartbeat time information includes a second heartbeat trigger time and a second time interval.

Optionally, the receiving, by the host, a first heartbeat packet sent by a first application in a client includes:

receiving, by the host, an encapsulated packet that is sent by the client; and obtaining, by the host, the first heartbeat packet that is of the first application and that is in the encapsulated packet by detecting the encapsulated packet.

It should be understood that, because there is no first preset list or second preset list, and the host cannot learn identification information of the first application, and cannot confirm a heartbeat packet in an encapsulated packet, the host needs to detect the received encapsulated packet sent by the client, and identify the first heartbeat packet in the encapsulated packet by means of detection.

It should be understood that, the second application and the first application may be of a same type or may be of different types. When the first application and the second application are of a same type, the host cannot learn the first heartbeat time information of the first application, and therefore the host may adjust a trigger time and a first time interval for a heartbeat packet of the first application in the client according to the second heartbeat time information of the second application in the host, and perform time synchronization between the first heartbeat time information and the second heartbeat time information of the second application in the host.

When the first application and the second application are of different types, the host cannot learn the first heartbeat time information of the first application, and therefore the host may adjust a trigger time and a first time interval for a first heartbeat packet of the first application in the client according to the second heartbeat time information of the second application in the host, and perform time synchronization between the first heartbeat time information and the second heartbeat time information of the second application in the host, where the second application may be an application that is in the host and whose heartbeat time and heartbeat time interval are closest to those of the first application.

Optionally, after the sending a second heartbeat packet to a server on a network side by using a proxy for the first application, the method further includes:

sending, by the host, indication information to the client, where the indication information instructs the host to send a second heartbeat packet to a server on a network side by using a proxy for the first application in the client.

It should be understood that, heartbeat packet processing by using a proxy refers to that the host may adjust time information of a heartbeat packet of an application in the host or adjust time information of a heartbeat packet of an application in the client, and perform time synchronization between heartbeat time information of the application in the client and heartbeat time information of the application in the host; the heartbeat packet processing by using a proxy may further include that the host keeps the application in the client online, and when the application in the client has a new message or a status of the application changes, the host may send a notification to the client by using WiFi or Bluetooth, to notify the application in the client.

It should be understood that, when the host has an application that is the same as the application in the client, the host may perform heartbeat packet processing by using a proxy for the application; when the host does not have an application that is the same as the application in the client, the host may attempt to perform heartbeat packet processing by using a proxy for the application. If an exception occurs in the client during the adjustment, for example, the host cannot respond to a message from the client or cannot adjust the trigger time or the time interval for the heartbeat packet of the application in the client, it indicates that the host cannot perform heartbeat packet processing by using a proxy for the application in the client.

It should be further understood that, when the host disconnects from the client, the host may re-establish the heartbeat packet processing by using a proxy for the first application in the client.

Optionally, when the first application in the client has a new message or a status of the first application changes, the host may send a notification to the client by using WiFi or Bluetooth.

It should be understood that, when the first application for which the host performs heartbeat packet processing by using a proxy has a new message or the status of the first application changes, the host may send a notification to the client by using the short range communications technology such as WiFi or Bluetooth, to notify the client that the heartbeat packet of the application changes.

Therefore, an embodiment of the present invention provides a method for heartbeat packet processing by using a proxy. A host performs time synchronization between first heartbeat time information and second heartbeat time information of a second application in the host, and sends a second heartbeat packet to a server on a network side by using the time-synchronized second application as a proxy for a first application, so that a client does not need to initiate a heartbeat packet event of the application in the client, so as to reduce a quantity of wakeup times of the client, and the host does not need to be awakened separately by the application in the client and the application in the host, so as to reduce a quantity of wakeup times of the host; therefore, power consumption of the host and the client can be reduced, achieving an objective of saving power for the host and the client.

FIG. 4 is a schematic diagram of another application scenario according to an embodiment of the present invention. As shown in FIG. 4, a host may be a mobile phone, and the mobile phone can connect to a network; a client may be a wearable device, such as a wrist watch; the host connects to and pairs with the client by using Bluetooth, and the host may manage a heartbeat packet of an application in the client, such as a heartbeat packet of WeChat.

Figure 5:
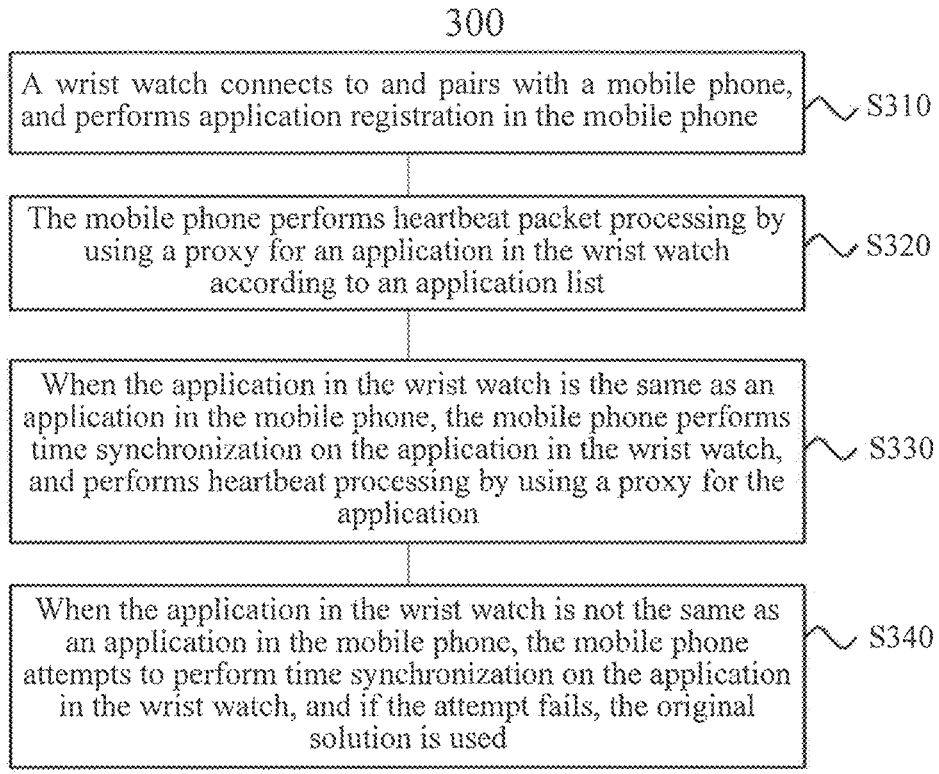
FIG. 5 is another schematic flowchart of a method for heartbeat packet processing by using a proxy according to an embodiment of the present invention.

Based on the application scenario described in FIG. 4, FIG. 5 is another schematic flowchart of a method for heartbeat packet processing by using a proxy according to an embodiment of the present invention. The host may be a mobile phone, and the client may be a wrist watch. The method 300 may include the following steps.

S310: A wrist watch connects to and pairs with a mobile phone, and performs application registration in the mobile phone.

In S310, the mobile phone may connect to and pair with the wrist watch by using Bluetooth, and the wrist watch may register an application with the mobile phone, where the application is an application that has a heartbeat packet and whose heartbeat time information can be adjusted by the mobile phone.

It should be understood that, the mobile phone herein is a mobile phone that connects to the network, the wrist watch performs application registration in the mobile phone, and the mobile phone may learn an application that is in the wrist watch and can perform heartbeat packet processing by using a proxy.

S320: The mobile phone performs heartbeat packet processing by using a proxy for an application in the wrist watch according to an application list.

In S320, it should be understood that, the mobile phone may perform heartbeat packet processing by using a proxy for the application in the wrist watch according to the application list, where the application in the wrist watch is in the application list.

The application list may be a first preset list, and the application list may include identification information of at least one application for which the host can perform heartbeat packet processing by using a proxy, for example, a name, and may further include time information of a heartbeat packet of at least one application. The heartbeat packet processing by using a proxy includes adjusting a heartbeat trigger time and a time interval of the application in the wrist watch, keeping the application in the wrist watch online, and notifying the wrist watch when the application is offline or has a new message.

S330: When the application in the wrist watch is the same as an application in the mobile phone, the mobile phone performs time synchronization on the application in the wrist watch, and performs heartbeat packet processing by using a proxy for the application.

In S330, the same application may be a third application, and the mobile phone understands heartbeat time information of the third application in the mobile phone, and may adjust a heartbeat trigger time and a time interval of the third application in the wrist watch according to the heartbeat time information of the third application in the mobile phone, so that heartbeat packet time information of the third application in the mobile phone is synchronized with heartbeat packet time information of the third application in the wrist watch. In addition, when the mobile phone includes an application list and the application list includes a third application, the mobile phone may, according to heartbeat packet time information of the third application in the application list, directly adjust a heartbeat trigger time and a time interval of the third application in the mobile phone, or directly adjust the heartbeat trigger time and the time interval of the third application in the wrist watch, so that the heartbeat packet time information of the third application in the mobile phone is synchronized with the heartbeat packet time information of the third application in the wrist watch, and the mobile phone performs heartbeat packet processing by using a proxy for the third application.

S340: When the application in the wrist watch is not the same as an application in the mobile phone, the mobile phone attempts to perform time synchronization on the application in the wrist watch, and if the attempt fails, the original solution is used.

In S340, when an application in the mobile phone is not the same as the application in the wrist watch, the mobile phone may attempt to perform time synchronization on the application in the wrist watch according to a heartbeat trigger time and a time interval of an application in the mobile phone. If the time synchronization cannot be achieved, the original solution is used. The original solution may refer to that the mobile phone pulls an application that is in the wrist watch and for which the heartbeat packet processing by using a proxy cannot be performed into the third preset list, or that the mobile phone does not adjust the heartbeat trigger time or the time interval of the application in the wrist watch.

Optionally, when the application that is in the wrist watch and for which the heartbeat packet processing by using a proxy is performed has a new message or the status of this application changes, the mobile phone notifies the wrist watch by using Bluetooth or WiFi.

Optionally, when communication between the mobile phone and the wrist watch is interrupted, the application in the wrist watch re-establishes a connection to the heartbeat packet in the mobile phone.

It should be understood that, when the application in the wrist watch is the same as an application in the mobile phone, and the communication between the mobile phone and the wrist watch is interrupted, the mobile phone re-adjusts the heartbeat trigger time and the time interval of the application in the wrist watch or the mobile phone, so as to achieve synchronization between the heartbeat time information of the application in the mobile phone and the heartbeat time information of the application in the wrist watch.

Therefore, an embodiment of the present invention provides a method for heartbeat packet processing by using a proxy. A host performs time synchronization between first heartbeat time information and second heartbeat time information of a second application in the host, and sends a second heartbeat packet to a server on a network side by using the time-synchronized second application as a proxy for a first application, so that a client does not need to initiate a heartbeat packet event of the application in the client, so as to reduce a quantity of wakeup times of the client, and the host does not need to be awakened separately by the application in the client and the application in the host, so as to reduce a quantity of wakeup times of the host; therefore, power consumption of the host and the client can be reduced, achieving an objective of saving power for the host and the client.

Figure 6:
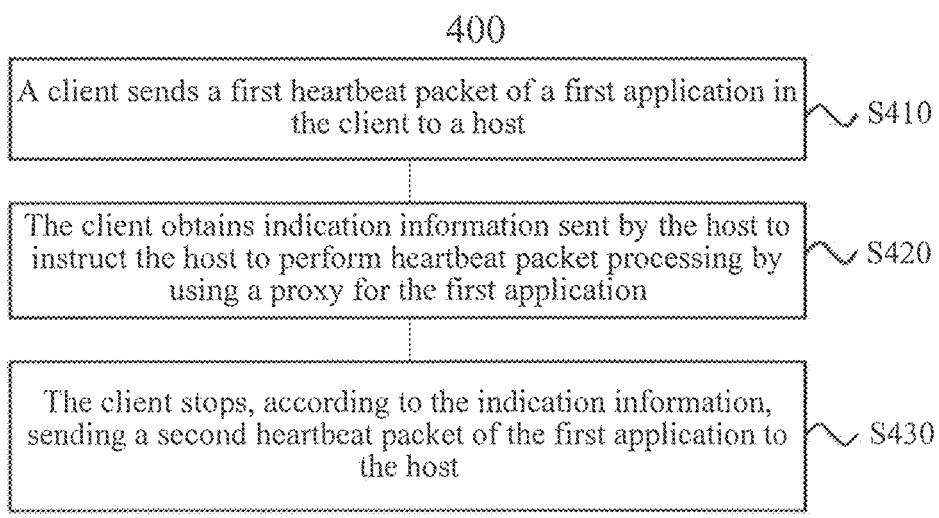
FIG. 6 is still another schematic flowchart of a method for heartbeat packet processing by using a proxy according to an embodiment of the present invention.

FIG. 6 is a schematic flowchart of a method for heartbeat packet processing by using a proxy according to an embodiment of the present invention. The method 400 may be executed by a client, and the method 400 includes the following steps.

S410: The client sends a first heartbeat packet of a first application in the client to a host.

In S410, the client may access the host by using a short range communications technology, and send the first heartbeat packet of the first application in the client to the host.

S420: The client obtains indication information sent by the host to instruct the host to perform heartbeat packet processing by using a proxy for the first application.

In S420, the host performs time synchronization between first heartbeat time information and second heartbeat time information of a second application in the host, and sends a second heartbeat packet to a server on a network side by using the time-synchronized second application as a proxy for the first application, and the host sends indication information to the client, to instruct the host to perform heartbeat packet processing by using a proxy for the first application; after obtaining the indication information, the client does not send a subsequent heartbeat packet of the first application to the host any longer.

S430: The client stops, according to the indication information, sending a second heartbeat packet of the first application to the host.

In S430, after obtaining the indication information, the client stops sending the second heartbeat packet of the first application to the host; and then, an application in the host initiates a heartbeat packet event in place of the first application in the client, and performs heartbeat packet processing, and the client may enter a sleep state.

It should be understood that, if in the first application, there is a new message or heartbeat packet disconnection occurs, the host instructs the client to perform processing.

Optionally, the client sends a first preset list to the host, where the first preset list includes at least one application that is preset and for which the host performs heartbeat packet processing by using a proxy.

It should be understood that, the client may send the first preset list to the host, and the host may quickly determine, according to the first preset list and the first heartbeat packet, whether to perform heartbeat packet processing by using a proxy for the first application, so as to save time, and increase the speed of the heartbeat packet processing by using a proxy.

Optionally, the client sends a second preset list to the host, where the second preset list includes a correspondence between at least one heartbeat packet and at least one piece of heartbeat time information.

It should be understood that, the client may send the second preset list to the host, and the host may determine the first heartbeat time information of the first application according to the second preset list and the first heartbeat packet. The host performs time synchronization between first heartbeat time information and second heartbeat time information of a second application in the host, and sends a second heartbeat packet to a server on a network side by using the time-synchronized second application as a proxy for a first application, to maintain a persistent connection between the first application and the server.

Therefore, an embodiment of the present invention provides a method for heartbeat packet processing by using a proxy. A client obtains indication information sent by a host, and stops sending a second heartbeat packet of a first application to the host. The client does not initiate a heartbeat packet event of an application in the client, so as to reduce a quantity of wakeup times of the client, and the host does not need to be awakened separately by the application in the client and the application in the host, so as to reduce a quantity of wakeup times of the host; therefore, power consumption of the host and the client can be reduced, achieving an objective of saving power for the host and the client.

In the foregoing, FIG. 1 to FIG. 6 show methods for heartbeat packet processing by using a proxy according to embodiments of the present invention. The following describes apparatuses for heartbeat packet processing by using a proxy according to embodiments of the present invention.

Figure 7:
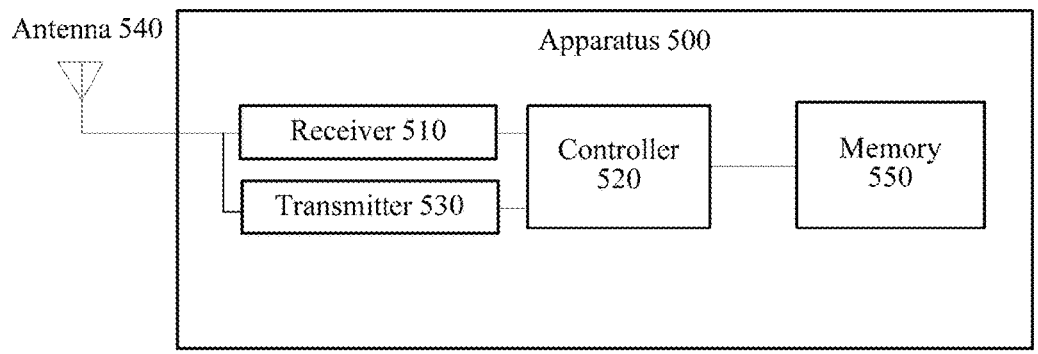
FIG. 7 is a schematic diagram of an apparatus according to an embodiment of the present invention.

FIG. 7 is a schematic diagram of an apparatus for heartbeat packet processing by using a proxy according to an embodiment of the present invention. As shown in FIG. 7, the apparatus may be a host, and the apparatus 500 includes:

a receiver 510, configured to receive a first heartbeat packet sent by a first application in a client, where the client is a terminal that accesses the apparatus by using a short range communications technology;

a controller 520, configured to determine, according to the first heartbeat packet received by the receiver and a first preset list, whether the first application is included in the first preset list, where the first preset list includes at least one application that is preset and for which the apparatus performs heartbeat packet processing by using a proxy;

if the first application is included in the first preset list, determine first heartbeat time information of the first application according to the first heartbeat packet; and perform time synchronization between the first heartbeat time information and second heartbeat time information of a second application in the apparatus, and send a second heartbeat packet to a server on a network side by using the time-synchronized second application as a proxy for the first application; and a transmitter 530, configured to send the second heartbeat packet of the first application to the server on the network side.

It should be understood that, the controller 520 may include an application processor (AP), a baseband processor, and the like, where some of functions implemented by the controller 520 may be executed by the AP, and some of the functions may be executed by the baseband processor. This is not limited in the present invention.

Optionally, the controller 520 is specifically configured to: determine, according to the first heartbeat packet and a second preset list, the first heartbeat time information, where the second preset list includes a correspondence between at least one heartbeat packet and at least one piece of heartbeat time information; or the first heartbeat packet carries the first heartbeat time information, and the controller 520 parses the first heartbeat packet to obtain the first heartbeat time information.

Optionally, the first heartbeat time information includes a first heartbeat trigger time and a first time interval, and the second heartbeat time information includes a second heartbeat trigger time and a second time interval.

Optionally, a third preset list is set in the apparatus, where the third preset list includes at least one application for which the apparatus does not perform heartbeat packet processing by using a proxy. The controller 520 is further configured to: if neither the first preset list nor the third preset list includes the first application, perform time synchronization between the first heartbeat time information and the second heartbeat time information of the second application in the apparatus within a preset adjustment time or for not more than a preset quantity of adjustment times, and send the second heartbeat packet to the server on the network side by using the time-synchronized second application as a proxy for the first application, to maintain a persistent connection between the first application and the server.

Optionally, the controller 520 is further configured to: if the third preset list includes the first application, skip sending the second heartbeat packet to the server on the network side by using a proxy for the first application.

Optionally, the controller 520 is further configured to compare the name of the first application with a name in the first preset list, to determine whether the first application is in the first preset list, where the first preset list specifically includes a respective name of the at least one application for which the apparatus performs heartbeat packet processing by using a proxy.

Optionally, the receiver 510 is further configured to send, to the client, indication information for instructing the apparatus to perform heartbeat packet processing by using a proxy for the first application.

It should be understood that, the first preset list or the second preset list may be pre-stored in the apparatus 500 or is received from the client, and the third preset list may be pre-stored in the apparatus 500.

It should be understood that, the apparatus 500 may further include an antenna 540, a memory 550, and the like.

It should be further understood that, the controller 520 may read code in the memory 550, and execute the foregoing corresponding method, and the second application may be installed in the memory 550 in the apparatus 500. In addition, the first preset list, the second preset list, and the third preset list may be all stored in the memory 550.

It should be understood that, the apparatus 500 according to this embodiment of the present invention may correspondingly execute a method according to an embodiment of the present invention, and the foregoing and other operations and/or functions of the components in the apparatus are respectively for implementing the corresponding processes of the methods in FIG. 2. For simplicity, details are not described herein again.

Therefore, an embodiment of the present invention provides an apparatus. A host performs time synchronization between first heartbeat time information and second heartbeat time information of a second application in the host, and sends a second heartbeat packet to a server on a network side by using the time-synchronized second application as a proxy for a first application, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Figure 8:
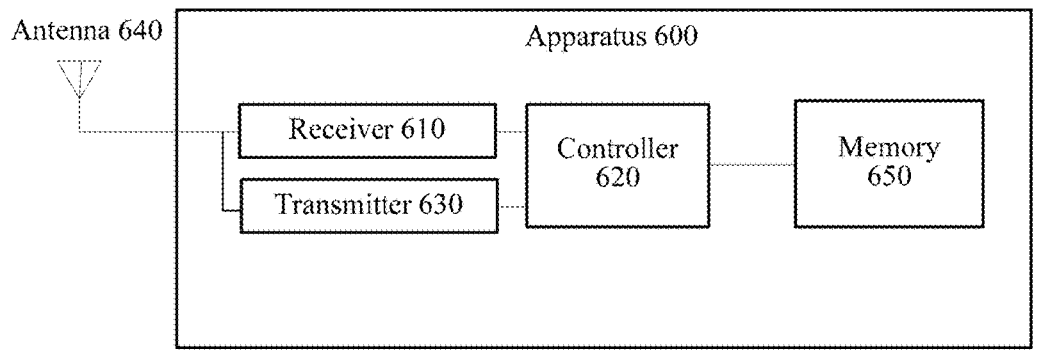
FIG. 8 is another schematic diagram of an apparatus according to an embodiment of the present invention.

FIG. 8 is a schematic diagram of an apparatus according to an embodiment of the present invention. As shown in FIG. 8, the apparatus may be a host, and the apparatus 600 includes:

a receiver 610, configured to receive a first heartbeat packet sent by a first application in a client, where the client is a terminal that accesses the apparatus by using a short range communications technology;

a controller 620, configured to adjust the first heartbeat time information to perform time synchronization with second heartbeat time information of a second application in the apparatus within a preset adjustment time or for not more than a preset quantity of adjustment times, and send a second heartbeat packet to a server on a network side by using the time-synchronized second application as a proxy for the first application; and a transmitter 630, configured to send the second heartbeat packet of the first application to the server on the network side.

It should be understood that, the controller 620 may include an application processor (AP), a baseband processor, and the like, where some of functions implemented by the controller 620 may be executed by the AP, and some of the functions may be executed by the baseband processor. This is not limited in the present invention.

Optionally, the first heartbeat time information includes a first heartbeat trigger time and a first time interval, and the second heartbeat time information includes a second heartbeat trigger time and a second time interval.

Optionally, the receiver 610 is further configured to receive an encapsulated packet that is sent by the client; the controller 620 is further configured to detect the encapsulated packet; and the receiver 610 is further configured to obtain the first heartbeat packet that is of the first application and that is in the encapsulated packet.

Optionally, the receiver 610 is further configured to send, to the client, indication information for instructing the apparatus to perform heartbeat packet processing by using a proxy for the first application.

It should be understood that, the apparatus 600 may further include an antenna 640, a memory 650, and the like.

It should be further understood that, the controller 620 may read code in the memory 650, and execute the foregoing corresponding method, and the second application may be installed in the memory 650 in the apparatus 600.

It should be understood that, the apparatus 600 according to this embodiment of the present invention may correspondingly execute a method according to an embodiment of the present invention, and the foregoing and other operations and/or functions of the components in the apparatus are respectively for implementing the corresponding processes of the methods in FIG. 3. For simplicity, details are not described herein again.

Therefore, an embodiment of the present invention provides an apparatus. A host adjusts first heartbeat time information to perform time synchronization with second heartbeat time information of a second application in the host within a preset adjustment time or for not more than a preset quantity of adjustment times, and sends a second heartbeat packet to a server on a network side by using the time-synchronized second application as a proxy for a first application, so that a client does not need to initiate a heartbeat packet event of the first application in the client, so as to reduce a quantity of wakeup times of the client, and the host does not need to be awakened separately by the first application in the client and the second application in the host, so as to reduce a quantity of wakeup times of the host; therefore, power consumption of the host and the client can be reduced, achieving an objective of saving power for the host and the client.

Figure 9:
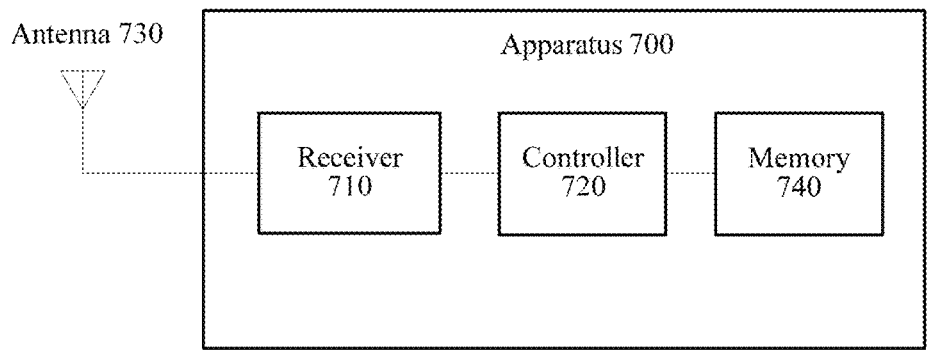
FIG. 9 is still another schematic diagram of an apparatus according to an embodiment of the present invention.

FIG. 9 is a schematic diagram of an apparatus according to an embodiment of the present invention. As shown in FIG. 9, the apparatus may be a client, and the apparatus 700 includes:

a receiver 710, configured to send a first heartbeat packet of a first application in the apparatus to the host; and obtain indication information sent by the host to instruct the host to perform heartbeat packet processing by using a proxy for the first application; and a controller 720, configured to stop, according to the indication information, sending a second heartbeat packet of the first application to the host.

It should be understood that, the controller 720 may include an application processor (AP, a baseband processor, and the like, where some of functions implemented by the controller 720 may be executed by the AP, and some of the functions may be executed by the baseband processor. This is not limited in the present invention.

Optionally, the receiver 710 is further configured to send a first preset list to the host, where the first preset list includes at least one application that is preset and for which the host performs heartbeat packet processing by using a proxy.

It should be understood that, the apparatus 700 may further include an antenna 730, a memory 740, and the like.

It should be further understood that, the controller 720 may read code in the memory 740, and execute the foregoing corresponding method, and the first application may be installed in the memory 740 in the apparatus 700. In addition, the first preset list may be stored in the memory 740.

It should be understood that, the apparatus 700 according to this embodiment of the present invention may correspondingly execute a method according to an embodiment of the present invention, and the foregoing and other operations and/or functions of the components in the apparatus are respectively for implementing the corresponding processes of the methods in FIG. 6. For simplicity, details are not described herein again.

Therefore, an embodiment of the present invention provides an apparatus. After a client obtains indication information sent by a host to instruct the host to perform heartbeat packet processing by using a proxy for a first application, the client does not need to initiate a heartbeat packet event of the first application in the client, so as to reduce a quantity of wakeup times of the client, and the host does not need to be awakened separately by the first application in the client and a second application in the host, so as to reduce a quantity of wakeup times of the host; therefore, power consumption of the host and the client can be reduced, achieving an objective of saving power for the host and the client.

In addition, a system for heartbeat packet processing by using a proxy according to an embodiment of the present invention may include the foregoing host or client.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage medium known in the art.

The present invention is described in detail with reference to the accompany drawings and in combination with the exemplary embodiments, but the present invention is not limited thereto. Various equivalent modifications or replacements can be made to the embodiments of the present invention by a person of ordinary skill in the art without departing from the essence of the present invention, and the modifications or replacements shall fall within the scope of the present invention.

What is claimed is:

1. A method for heartbeat packet processing by using a proxy, applied to a host, the method comprising:
    receiving, by the host, a first heartbeat packet sent by a first application in a client, wherein the client is a terminal that accesses the host by using a short range communications technology including near field communication, infrared, and Bluetooth;
    determining, by the host according to the first heartbeat packet and a first preset list, whether the first application is comprised in the first preset list, wherein the first preset list comprises at least one preset application for which the host performs heartbeat packet processing by using a proxy;
    when the first application is comprised in the first preset list, determining, by the host, first heartbeat time information of the first application according to the first heartbeat packet, the determining, by the host, the first heartbeat time information comprising at least one of:
        determining, by the host according to the first heartbeat packet and a second preset list, the first heartbeat time information, wherein the second preset list comprises a correspondence between at least one heartbeat packet and at least one piece of heartbeat time information; and
        when the first heartbeat packet carries the first heartbeat time information, parsing, by the host, the first heartbeat packet to obtain the first heartbeat time information; and
    performing, by the host, time synchronization between the first heartbeat time information and second heartbeat time information of a second application in the host, and sending a second heartbeat packet to a server on a network side by using the time-synchronized second application as a proxy for the first application.

2. The method according to claim 1, wherein the first heartbeat time information comprises a first heartbeat trigger time and a first time interval, and the second heartbeat time information comprises a second heartbeat trigger time and a second time interval.

3. The method according to claim 1, wherein the host further comprises a third preset list, the third preset list comprising at least one application for which the host does not perform heartbeat packet processing by using a proxy, the method further comprising:
    when neither the first preset list nor the third preset list comprises the first application, performing, by the host, time synchronization between the first heartbeat time information and the second heartbeat time information of the second application in the host within a preset adjustment time or for not more than a preset quantity of adjustment times, and sending the second heartbeat packet to the server on the network side by using the time-synchronized second application as a proxy for the first application, to maintain a persistent connection between the first application and the server.

4. The method according to claim 3, further comprising:
    when the third preset list comprises the first application, skipping sending, by the host, the second heartbeat packet to the server on the network side by using a proxy for the first application.

5. The method according to claim 1, wherein determining, by the host according to the first heartbeat packet and the first preset list, whether the first application is comprised in the first preset list comprises:
    determining a name of the first application according to the first heartbeat packet; and
    comparing the name of the first application with a name in the first preset list, to determine whether the first application is comprised in the first preset list, wherein the first preset list comprises a name of the at least one application for which the host performs heartbeat packet processing by using a proxy.

6. The method according to claim 1, further comprising, after the sending a second heartbeat packet to a server on a network side by using a proxy for the first application:
    sending, by the host to the client, indication information for instructing the host to perform heartbeat packet processing by using a proxy for the first application.

7. A method for heartbeat packet processing by using a proxy, applied to a host, the method comprising:
    receiving, by the host, a first heartbeat packet sent by a first application in a client, wherein the client is a terminal that accesses the host by using a short range communications technology including near field communication, infrared, and Bluetooth;
when the first application is comprised in a first preset list, determining first heartbeat time information of the first application according to the first heartbeat packet, the determining, by the host, the first heartbeat time information comprising at least one of:
determining, according to the first heartbeat packet and a second preset list, the first heartbeat time information, wherein the second preset list comprises a correspondence between at least one heartbeat packet and at least one piece of heartbeat time information; and
when the first heartbeat packet carries the first heartbeat time information, parsing, the first heartbeat packet to obtain the first heartbeat time information; and
adjusting, by the host, a first heartbeat time information of the first heartbeat packet to perform at least one of time synchronization with second heartbeat time information of a second application in the host within a preset adjustment time and time synchronization with the second heartbeat time information of the second application in the host for not more than a preset quantity of adjustment times, and sending a second heartbeat packet to a server on a network side by using the time-synchronized second application as a proxy for the first application.

8. The method according to claim 7, wherein the first heartbeat time information comprises a first heartbeat trigger time and a first time interval, and the second heartbeat time information comprises a second heartbeat trigger time and a second time interval.

9. The method according to claim 7, wherein the receiving, by the host, a first heartbeat packet sent by a first application in a client comprises:
receiving, by the host, an encapsulated packet that is sent by the client; and
obtaining, by the host, the first heartbeat packet that is of the first application and that is in the encapsulated packet by detecting the encapsulated packet.

10. The method according to claim 7, further comprising, after the sending a second heartbeat packet to a server on a network side by using a proxy for the first application:
sending, by the host, to the client, indication information for instructing the host to perform heartbeat packet processing by using a proxy for the first application.

11. An apparatus, comprising:
a receiver;
a transmitter;
a processor; and
a non-transitory computer-readable storage medium including computer-executable instructions executed by the processor to perform operations comprising:
receiving, by the receiver, a first heartbeat packet sent by a first application in a client, wherein the client is a terminal that accesses the apparatus by using a short range communications technology including near field communication, infrared, and Bluetooth;
determining, according to the first heartbeat packet received by the receiver and a first preset list, whether the first application is comprised in the first preset list, wherein the first preset list comprises at least one preset application for which the apparatus performs heartbeat packet processing by using a proxy;
when the first application is comprised in the first preset list, determining first heartbeat time information of the first application according to the first heartbeat packet, the determining, by the host, the first heartbeat time information comprising at least one of:
determining, by the host according to the first heartbeat packet and a second preset list, the first heartbeat time information, wherein the second preset list comprises a correspondence between at least one heartbeat packet and at least one piece of heartbeat time information; and
when the first heartbeat packet carries the first heartbeat time information, parsing, by the host, the first heartbeat packet to obtain the first heartbeat time information; and
performing time synchronization between the first heartbeat time information and second heartbeat time information of a second application in the apparatus; and
sending, by the transmitter, the second heartbeat packet of the first application to a server on a network side.

12. The apparatus according to claim 11, wherein the non-transitory computer-readable storage medium further includes a third preset list, wherein the third preset list comprises at least one application for which the apparatus does not perform heartbeat packet processing by using a proxy, and the operations further comprise:
when neither the first preset list nor the third preset list comprises the first application, performing at least one of time synchronization between the first heartbeat time information and the second heartbeat time information of the second application in the apparatus within a preset adjustment time and time synchronization between the first heartbeat time information and the second heartbeat time information of the second application in the apparatus for not more than a preset quantity of adjustment times, and sending the second heartbeat packet to the server on the network side by using the time-synchronized second application as a proxy for the first application, to maintain a persistent connection between the first application and the server.

13. An apparatus, comprising:
a receiver;
a transmitter;
a processor; and
a non-transitory computer-readable storage medium including computer-executable instructions executed by the processor to perform operations comprising:
receiving, by the receiver, a first heartbeat packet sent by a first application in a client, wherein the client is a terminal that accesses the apparatus by using a short range communications technology including near field communication, infrared, and Bluetooth;
when the first application is comprised in a first preset list, determining first heartbeat time information of the first application according to the first heartbeat packet, the determining the first heartbeat time information comprising at least one of:
determining, according to the first heartbeat packet and a second preset list, the first heartbeat time information, wherein the second preset list comprises a correspondence between at least one heartbeat packet and at least one piece of heartbeat time information; and
when the first heartbeat packet carries the first heartbeat time information, parsing, by the host, the first heartbeat packet to obtain the first heartbeat time information; and
adjusting the first heartbeat time information to perform at least one of time synchronization with second heartbeat time information of a second application in the apparatus within a preset adjustment time and time synchronization with second heartbeat time information of a second application in the apparatus for not more than a preset quantity of adjustment times; and sending, by the transmitter, the second heartbeat packet of the first application to a server on a network side.

14. The apparatus according to claim 13, wherein the first heartbeat time information comprises a first heartbeat trigger time and a first time interval, and the second heartbeat time information comprises a second heartbeat trigger time and a second time interval.

* * * * *